United States Patent [19]

Stepanek

[11] Patent Number: 5,922,455
[45] Date of Patent: Jul. 13, 1999

[54] HOLOGRAPHICALLY ENHANCED WRAPPING ELEMENTS

[75] Inventor: Peter Bruce Stepanek, Amherst, N.H.

[73] Assignee: Hampshire Holographic Manufacturing Corp., Milford, N.H.

[21] Appl. No.: 08/879,700

[22] Filed: Jun. 18, 1997

Related U.S. Application Data

[63] Continuation-in-part of application No. 08/657,285, Jun. 4, 1996, abandoned.

[51] Int. Cl.$^6$ .................................................... B32B 15/04
[52] U.S. Cl. ......................... 428/332; 428/195; 428/209; 428/337; 428/457; 428/458; 428/461; 428/464; 428/542.6
[58] Field of Search .................................. 428/195, 209, 428/457, 458, 461, 464, 542.6, 332, 337

[56] References Cited

U.S. PATENT DOCUMENTS

| | | | |
|---|---|---|---|
| 3,786,222 | 1/1974 | Harnden et al. | 219/10.49 |
| 4,773,718 | 9/1988 | Weitzen et al. | 350/3.61 |
| 4,893,887 | 1/1990 | Coates | 350/3.6 |
| 5,155,604 | 10/1992 | Miekka et al. | 359/2 |
| 5,281,499 | 1/1994 | Bussard | 430/1 |
| 5,455,129 | 10/1995 | Bussard | 430/1 |
| 5,464,690 | 11/1995 | Boswell | 428/334 |
| 5,615,534 | 4/1997 | Weder | 53/410 |

*Primary Examiner*—Marie Yamnitzky
*Assistant Examiner*—Michael E. Grendzynski
*Attorney, Agent, or Firm*—Stephen W. White

[57] ABSTRACT

A novel wrapping element comprising at least two layers in intimate contact is described. This element has a sealing layer which is applied to the element to be wrapped and a forming layer which is holographically enhanced on the outside. The holographic enhancement adds interest and beauty to the element to be wrapped which may include flower and floral arrangements, flower pots, and gifts, among others. Since the sealing layer will hold in any moisture or other material which may leak therefrom and since the forming layer permits the forming of the wrapping element about the element to be wrapped, there is great utility within this use.

6 Claims, 3 Drawing Sheets

HOLOGRAPHICALLY ENHANCED WRAPPING ELEMENTS

CROSS-REFERENCE TO RELATED APPLICATIONS

This application is related to my previously filed application, namely U.S. Ser. No. 08/657,285, filed Jun. 4, 1996, now abandoned, and is a Continuation-In-Part thereof.

BACKGROUND

1. Field of the Invention

This invention relates to the field of wrapping elements and more specifically to wrapping elements that are useful within the floral industry. Still more specifically, this invention relates to wrapping elements that comprise two layers of material that are laminated together and are used to form a decorative wrapping element around a floral arrangement or flower pot, for example. Still more specifically, this invention relates to layered, floral wrapping elements that have been holographically enhanced in order to impart a more pleasing, beautifying and decorative value thereto.

2. Description of the Prior Art

It is well-known within the wrapping industry to provide wrapping elements that provide beauty and enhance objects that are wrapped therein. Objects such as gifts, flowers and the like are conventionally wrapped to enhance the beauty thereof. It is also known in the prior art to provide a wrapping element for flower pots and the like. These flower pot wrapping elements have conventionally been manufactured from heavy duty, strong materials such as plastics and the like in order to survive the rigor of wrapping up these elements. It is also known to provide an alternative material which is made by laminating or gluing two or more layers of material in intimate contact together. Thus, conventional flower pots and the like are wrapped up in a laminated material which may contain a sheet of plastic glued to a sheet of aluminum, for example. The plastic side of this laminate (known as the "sealing layer") is conventionally placed against the surface of the flower pot while the aluminum side of this laminate (also known as the "forming layer") is on the outside thereof and permits the entire element to be "formed" around the shape of the flower pot used. The sealing layer will provide some water proofing to this system so that when the flowers or plants contained in the pot are watered, leakage is prevented or slowed. Colored plastic or aluminum layers have been used to make this laminated material and to add some beauty thereto. Other decorations or advertisements may be added to the laminate if desired, but this then adds cost and time to the manufacture of these wrapping elements.

Holographically enhanced materials are also known in the prior art. These are usually made by a proprietary process which includes, among others, passing a layer of plastic, for example, through a machine that imparts a variated image on the upper strata of the plastic. This can be done by a special embossing machine, for example. A powdered metallic material (e.g., powdered aluminum) is then applied to this variated image by a special process whereby the metal adheres to the imaged areas. This process is the so-called "metallizing process". After this metallizing step, the image on the plastic appears to have a holographic or three-dimensional appearance. This image can be extremely pleasing to the eye and is very desirable in the advertising field. Additionally, each of these images is very hard to duplicate and thus has found wide use within the credit card industry to prevent fraud and for other security purposes. The drawback to the use of this particular image is the cost since the machines that produce the image are very complicated and expensive. Thus, this particular material has not found wide use outside of the credit card and novelty industries.

Yet another prior art element that uses holographic images is described by Miekka et al. In U.S. Pat. No. 5,155,604, Oct. 13, 1992. This reference describes how a paper base is subsequently coated using a specific coating or extrusion process with a thermoplastic material to make a laminate of paper and plastic. The coated sheet is then heated and the softened plastic layer is then embossed to provide the requisite diffraction pattern that forms the holographic image. This holographic image may also be metallized to enhance the hologram. This final material may also be used within the security or novelty industries. The process of applying the thermoplastic layer and the composition thereof is what is proprietary and this material is used directly within the credit card industry, for example.

Recently, a novel process for making large sheets of holographically enhanced material (e.g., plastics) has been developed. Thus, the costs of such holographically enhanced plastic has been significantly reduced.

SUMMARY OF THE INVENTION

It is an object of this invention to provide wrapping materials that are both decorative and useful for the wrapping of objects and the like. It is a further object of this invention to provide such wrapping materials that can easily be formed around and subsequently conform to the shape of the object to be wrapped. A still further object of this invention is to provide formed wrapping elements that seal around the object to be wrapped and prevent any material from exuding therefrom. It is still a further object to provide the aforementioned wrapping elements with a holographic image or decoration thereon. These and yet other objects can be achieved in a wrapping element comprising two layers laminated together, the first of said layers comprising a sealing element having a holographic image imparted thereon, and the second of said layers comprising a forming element.

In a particularly preferred embodiment, the aforementioned sealing element is a plastic element having two sides, the first side having a decorative, holographic image imparted thereon and the second side being laminated to a forming element whereby said forming element is an aluminum layer.

This invention also relates to a method or process for forming and sealing a flower pot in a holographically enhanced wrapping element, said flower pot having a size defined by a bottom, a plurality of sides and an internal section designed to contain flowers or plants, and wherein said wrapping element comprises two layers laminated together, the first of said layers comprising a forming element which will form to the size of the flower pot, and the second of said layers comprising a sealing element having been holographically enhanced and further comprising the steps of:

a. laying said wrapping element on a flat surface with said sealing element facing said surface and said forming element being present in an upward position;

b. placing said bottom of said flower pot on to the forming element;

c. wrapping said flower pot in said wrapping element by bringing up the wrapping element up and around said flower pot so as to conform to the size thereof.

DETAILS OF THE INVENTION

Figure 1:
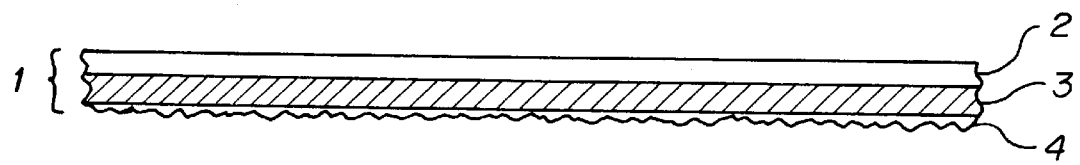
FIG. 1 is a side view of the wrapping element of this invention.

Looking now specifically at the drawings, which show some of the preferred embodiments of the elements of this invention and the process thereof, FIG. 1 is a side view of the wrapping element showing the various layers thereon. In this particular showing I is the wrapping element of this invention which is a combination of two layers laminated together by gluing, lamination or other process, wherein 2 is a forming layer, 3 is a sealing layer which has previously been holographically enhanced prior to lamination to the forming layer 2. The holographic enhancement is graphically shown as an irregular line 4 in this figure.

Figure 2:
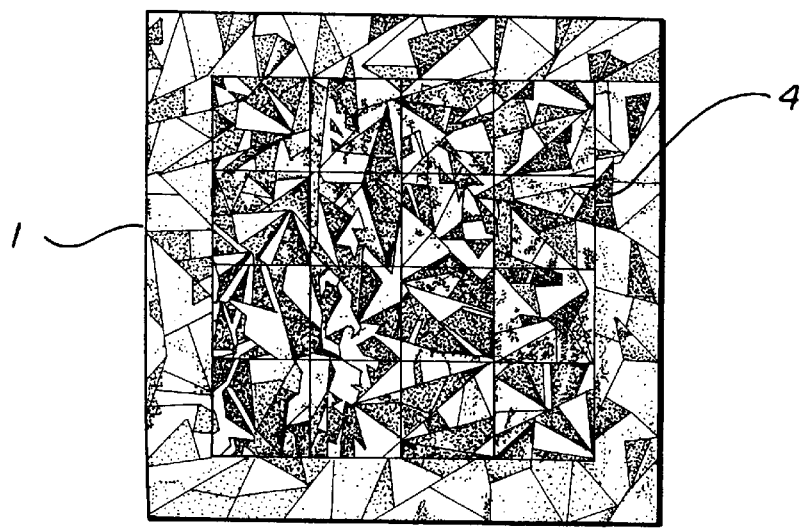
FIG. 2 is a top view of an actual wrapping element of this invention with the view being from the holographically enhanced side thereof.

FIG. 2 is an actual showing of a piece of the wrapping element of this invention 1. In this showing, the forming layer 2 (which cannot be clearly seen) is being viewed through the holographic enhancement 4.

Figure 3:
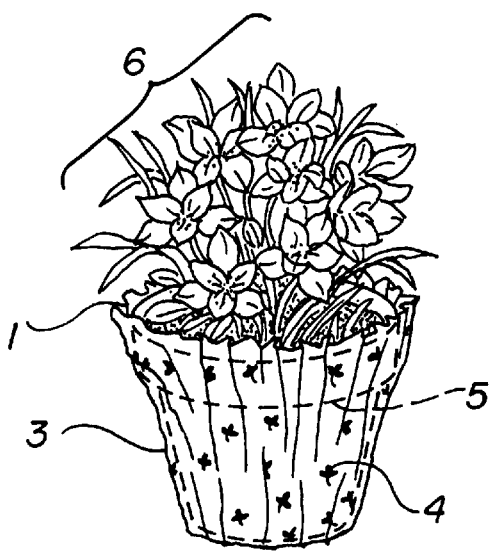
FIG. 3 is a showing of a flower pot wrapped in the wrapping element of this invention.

FIG. 3 is a showing of a flower pot 5 (shown by both solid and dashed lines), the flower pot containing a group of flowers or other floral arrangement graphically shown as 6 and wherein the flower pot has been wrapped up in the wrapping element 1 of this invention, as previously described above, with the sealing layer 3 holographically enhanced as 4 being on the outside so as to provide a decorative mode to the wrapped flower pot. The forming layer 2 is then against the flower pot itself. In this particular embodiment (which is preferred) the flower pot containing the floral or decorative plant material, is easily wrapped up and sealed against any possible leakage therefrom (e.g., from water used to water the flowers). The forming layer 2 is crushed against the pot itself forming to the shape thereof and providing the decorative, sealing layer 3 outside, said layer having been holographically enhanced so as to provide the desired decoration thereon.

Figure 4:
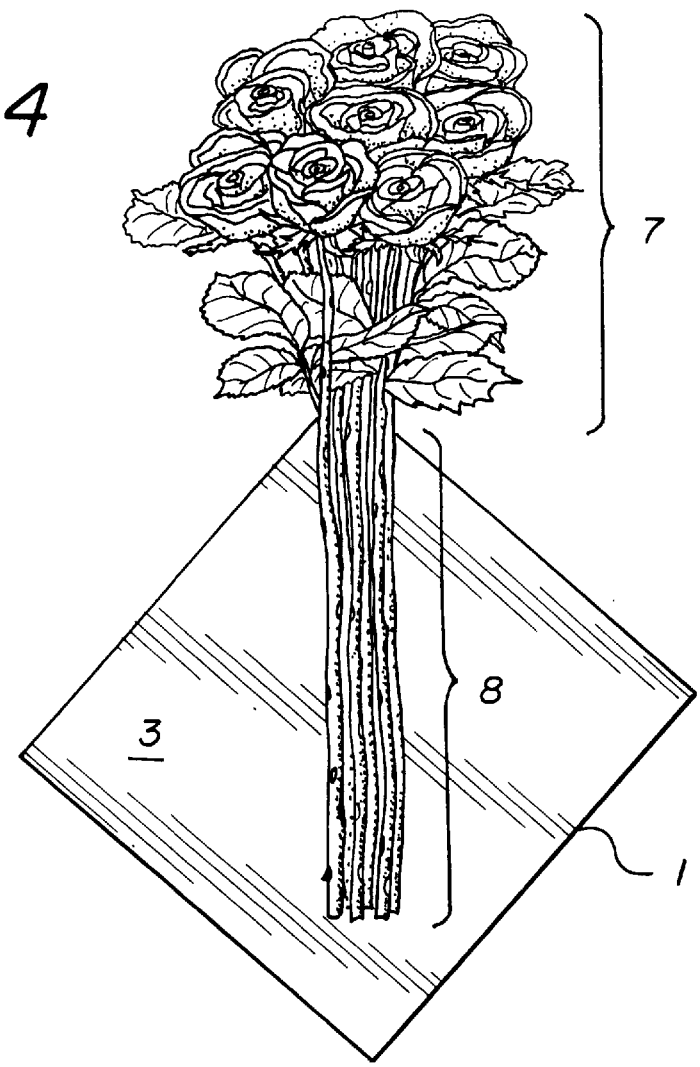
FIG. 4 is a showing of a group of flowers about to be wrapped in the wrapping element of this invention.

FIG. 4 is a showing of a group of flowers 7 being wrapped up in the wrapping element 1 of this invention. In this particular showing, the sealing layer 3 is on the viewing side against the stems 8 of the flowers 7.

Figure 5:
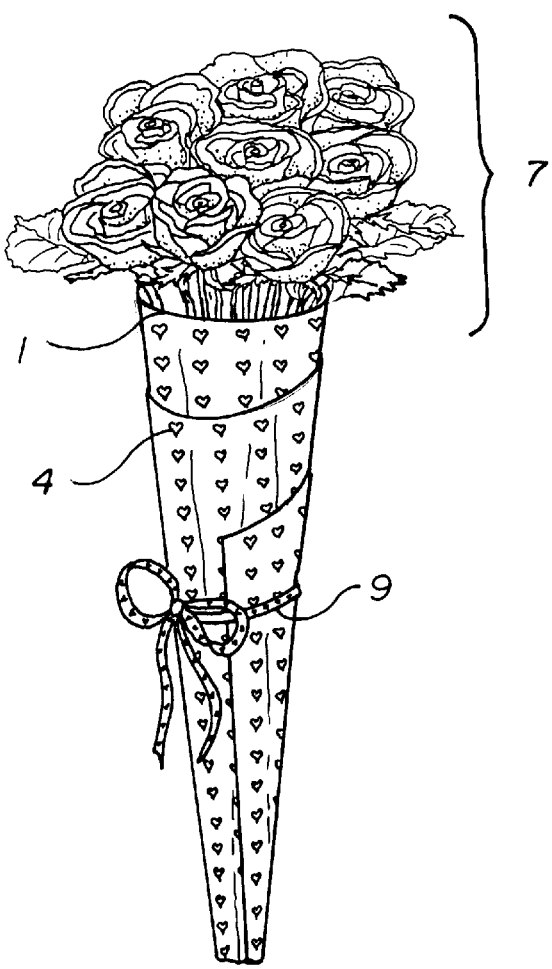
FIG. 5 is a continuation of FIG. 4 showing the flowers completely wrapped within the wrapping element of this invention.

In FIG. 5 the flowers 7 have been neatly wrapped within the wrapping element 1 of this invention. The holographically enhanced layer 4 (herein shown as a design of hearts, for example) is on the outside of the forming layer 2 (which again is not necessarily viewable through the holographic enhancement in this particular figure). A decorative ribbon 9 is shown in this figure and embodiment but this is not always necessary to keep the wrapping element around the floral arrangement since the forming layer itself will form neatly in place. The stems of the flowers are not seen since they have been now encompassed with the wrapping element 1.

Figure 6:
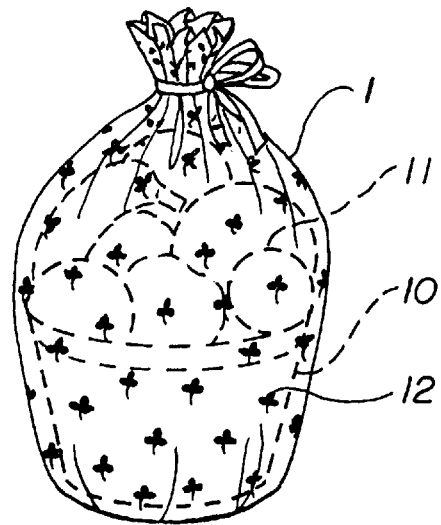
FIG. 6 is a gift wrapped within the wrapping element of this invention.

FIG. 6 shows a gift wrapped within the wrapping elements of this invention. In this particular figure, a gift basket of fruit (shown by dotted lines) is within the wrapping element 1. The wrapping element has been thoroughly formed around the gift basket 10 containing the fruit 11. Solid markings shown as 12 on the surface of the sealing layer indicate the holographic enhancement thereon.

The wrapping element of this invention may be made by laminating or gluing two separate layers together. One of these layers is the sealing layer and within the ambit of this invention the following materials may be used to construct this sealing layer:

polyesters such as polyethylene terephthalate;

low and high density polyethylenes;

polypropylenes including those that are biaxially and monoaxially oriented and cast materials;

materials made from ethylene-propylene random copolymers;

polybutylenes;

polymethylpentenes;

materials known commonly as "nylons";

cast acrylates;

cellulosic materials such as cellulose acetate;

polycarbonates;

polystyrenes;

polyurethanes;

cellophane;

polyimides;

styrene butadiene; among others.

These materials, which are some of the more common materials known in the prior art as "plastics", are usually fairly thin with a thickness of between 0.25 mils and 25 mils or so. These materials can be used to stop the flow of liquids such as water which may be present within the items that are wrapped therein and to prevent leakage therefrom. These sealing layers may be holographically enhanced to further form a decorative layer thereon. This holographic enhancement process may follow the procedures described in the previously mentioned Miekka et al. U.S. Pat. No. 5,155,604, among others. Thus, the sealing or plastic film layer is embossed or otherwise treated according to the teachings of the prior art in order to obtain a holographic image on one surface thereof.

The forming layer, which also makes up a part of the wrapping element of this invention is an aluminum layer. This aluminum layer may also be between 0.25 to 25 mils in thickness. Aluminum will form easily when crushed or wrapped around an object.

The forming and sealing layers are then laminated or glued together to form the wrapping element of this invention. Thus, in a particularly preferred embodiment of this invention, a layer of polyester (e.g., polyethylene terephthalate 0.25 to 8 mils thick)—the sealing layer—is first holographically enhanced as described above and then the holographic image is further metallized with powdered aluminum to define that image further. There are two sides to the polyester sealing layer, one side having been holographically enhanced. The second side is then coated with a thin layer of poly-pro™, a commercially available, heat sealable material. The coating weight of this heat sealable material is about 0.25 to 1 mil in thickness. This side of the sealing layer is then laminated to an aluminum foil (0.15 to 10 mils thick)—the forming layer—and the result is the wrapping element 1 as shown in FIG. 1. This element may then be used to wrap any number of different items such as floral arrangements; flower pots; gifts; etc. Since this novel wrapping element will contain a relatively inexpensive holographic image on the surface thereof, it can be a great enhancement to any product wrapped therein. No paper is used at any time and the sealing layer (e.g., the plastic sheet) is holographically enhanced and the image metallized prior to lamination of an aluminum layer thereon. There are no prior art elements that can be used in such a fashion. Since the aluminum layer conforms nicely to the item to be wrapped, wrapping is easy and quick. The presence of the sealing layer means that any liquids present will be contained and not leak out. Additionally, holographic enhancement of this product means that colorful and meaningful advertisements and the like may be added to the wrapping element, greatly increasing the utility thereof.

I claim:

1. A decorative wrapping element for wrapping, forming and sealing objects therein, said wrapping element comprising a first layer and a second layer, said first layer comprising a sealing element and said second layer comprising an aluminum forming element with a thickness of between 0.25 and 25 mils wherein said sealing element is a plastic element having two sides, one of said sides being laminated to said forming element and the second of said sides being holographically enhanced.

2. The wrapping element of claim 1 wherein said objects are taken from the group consisting of flowers, floral arrangements, flower pots and gifts.

3. The wrapping element of claim 1 wherein said sealing element is taken from the group consisting of polyesters; low and high density polyethylenes; polypropylenes; ethylene-propylene random co-polymers; polybutylenes; polymethlpertenes; nylons; cellulosic materials; polyvinylchloride; polycarbonates; polystyrenes; polyurethanes; cellophane; polyimides; and styrene butadiene.

4. The wrapping element of claim 1 wherein said forming element is holographically enhanced by embossing a pattern thereon and subsequently metallizing said embossed pattern.

5. A flower pot decoratively wrapped in the wrapping element of claim 1.

6. The wrapping element of claim 1 wherein said layers are laminated together by gluing.

* * * * *